(12) United States Patent
Sasahara et al.

(10) Patent No.: US 10,451,179 B2
(45) Date of Patent: Oct. 22, 2019

(54) CONTROL APPARATUS FOR VEHICLE AUTOMATIC TRANSMISSION

(71) Applicant: HONDA MOTOR CO., LTD., Tokyo (JP)

(72) Inventors: Kazuma Sasahara, Wako (JP); Yutaka Ishikawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/937,067

(22) Filed: Mar. 27, 2018

(65) Prior Publication Data
US 2018/0274669 A1 Sep. 27, 2018

(30) Foreign Application Priority Data

Mar. 27, 2017 (JP) ................ 2017-062007

(51) Int. Cl.
*F16H 61/02* (2006.01)
*F16H 59/48* (2006.01)
*F16H 59/44* (2006.01)
*F16H 59/00* (2006.01)
*F16H 59/36* (2006.01)

(52) U.S. Cl.
CPC ........ *F16H 61/0213* (2013.01); *F16H 59/48* (2013.01); *F16H 59/44* (2013.01); *F16H 2059/003* (2013.01); *F16H 2059/366* (2013.01); *F16H 2061/0225* (2013.01)

(58) Field of Classification Search
CPC ...... F16H 61/0213; F16H 59/48; F16H 59/44; F16H 2059/003; F16H 2059/366; F16H 2061/0225; F16H 2061/0227; F16H 2061/0022
See application file for complete search history.

(56) References Cited

U.S. PATENT DOCUMENTS

| 6,577,334 | B1 * | 6/2003 | Kawai | B60G 17/0165 348/148 |
|---|---|---|---|---|
| 6,725,144 | B2 * | 4/2004 | Shiimado | F16H 61/66259 701/51 |
| 6,920,384 | B2 * | 7/2005 | Shiimado | F16H 61/0213 477/97 |

(Continued)

FOREIGN PATENT DOCUMENTS

JP 2013-142436 A 7/2013

*Primary Examiner* — Tinh T Dang
(74) *Attorney, Agent, or Firm* — Westerman, Hattori, Daniels & Adrian, LLP

(57) ABSTRACT

A control apparatus for a vehicle automatic transmission includes a downshift determining unit that determines whether downshift of a gear shift stage is to be performed based on at least one of a history of lateral accelerations and a history of variations of a vehicle speed. A lateral acceleration history acquiring unit or a vehicle speed variation history acquiring unit returns at least one of the history of the lateral accelerations and the history of the variations of the vehicle speed to an initial value when a shift control mode determined by a shift control mode determining unit is switched. At least one of the initial value of the history of the lateral accelerations and the initial value of the history of the variations of the vehicle speed is a value that is set for each shift control mode determined by the shift control mode determining unit.

8 Claims, 5 Drawing Sheets

(56) References Cited

U.S. PATENT DOCUMENTS

| | | | | |
|---|---|---|---|---|
| 7,469,178 B2* | 12/2008 | Shiiba | ................. | B60W 10/115 |
| | | | | 477/40 |
| 8,380,406 B2* | 2/2013 | MacFarlane | .......... | B60W 10/06 |
| | | | | 477/115 |
| 8,560,188 B2* | 10/2013 | Ishikawa | ................ | B60W 10/11 |
| | | | | 192/3.29 |
| 2005/0218718 A1* | 10/2005 | Iwatsuki | ............... | B60T 8/1766 |
| | | | | 303/177 |
| 2019/0129424 A1* | 5/2019 | Kishi | .................. | G05D 1/0088 |

* cited by examiner

CONTROL APPARATUS FOR VEHICLE AUTOMATIC TRANSMISSION

CROSS REFERENCES TO RELATED APPLICATIONS

The present application claims priority under 35 U.S.C. § 119 to Japanese Patent Application No. 2017-062007, filed Mar. 27, 2017, entitled "Control Apparatus for Vehicle Automatic Transmission." The contents of this application are incorporated herein by reference in their entirety.

BACKGROUND

1. Field

The present disclosure relates to a control apparatus for a vehicle automatic transmission. The control apparatus performs upshift and downshift control of a gear shift stage.

2. Description of the Related Art

A typical control apparatus for a vehicle automatic transmission prepares multiple kinds of shift maps used to determine shift characteristics, determines whether a vehicle is driving on a flat road, an uphill road, or a downhill road based on a value that is calculated from acceleration and that indicates a running resistance to select one of the shift maps based on the result of the determination, and controls a transmission gear ratio based on the selected shift map. Specifically, the control apparatus determines the uphill-downhill degree (road gradient) through comparison between an estimated acceleration, which is set in advance based on an engine output, and an actual acceleration, which is actually calculated, to select an optimal shift map and determines the transmission gear ratio based on the selected shift map.

Japanese Unexamined Patent Application Publication No. 2013-142436 discloses a control apparatus for a vehicle automatic transmission, which performs downshift (brake-down) control and shift-hold control. In the downshift control, a deceleration state of a vehicle is determined and, if the vehicle is in a certain deceleration state, the automatic transmission is shifted down to a certain shift position. In the shift-hold control, for example, when a vehicle after downshift is going around a corner, the gear shift stage is kept at a lower-speed stage side by delaying upshift to stabilise the driving of the vehicle and to enable rapid acceleration (re-acceleration) of the vehicle when the vehicle passes through the corner.

The shift characteristics including an allowable rotation speed of an engine during the downshift and the time (hold time) during which the shift-hold state is kept are optimised using a history of driving operations by the driver of a vehicle in the downshift control and the shift-hold control in related art. The history of driving operations by the driver of the vehicle is, for example, a history of accelerations and decelerations or a history of variations of lateral acceleration of the vehicle. In other words, the history of the accelerations and decelerations and the history of the variations of the lateral acceleration of the vehicle are varied with the history of driving operations by the driver to vary the degree of the shift-hold. As described above, the shift characteristics including the allowable rotation speed of the engine during the downshift and the shift-hold time are optimised based on the history of driving operations by the driver.

However, in the downshift, control and the shift-hold control in the related art, parameters of the acceleration and deceleration history and the lateral acceleration history are constantly varied from the same value at a time when a shift position or a driving mode (shift control mode) of the vehicle is changed in response to an operation by the driver with a select lever, and the final values of the parameters of the acceleration and deceleration history and the lateral acceleration history of the vehicle are determined based on the acceleration and deceleration history and the lateral acceleration history that are subsequently acquired. Accordingly, the final values (values to be finally set) of the acceleration and deceleration history and the lateral acceleration history of the vehicle, which are made by the driving operations by the driver after the shift position or the shift control mode has been changed, are not estimated in advance.

Accordingly, there is a problem in that it takes a time to match the shift characteristics in the shift position or the shift control mode after the shift position or the shift control mode is changed with characteristics meeting the preference of the driver of the vehicle.

SUMMARY

It is desirable to provide a control apparatus for a vehicle automatic transmission, which is capable of matching the shift characteristics in the shift position or the shift control mode after change with characteristics meeting the preference of the driver in a short time by estimating and varying the acceleration and deceleration history and the lateral acceleration history of the vehicle.

The present application describes a control apparatus for a vehicle automatic transmission, which performs upshift and downshift control of a gear shift stage. The control apparatus includes a shift control mode determining/detecting unit that determines/detects a shift control mode selected with an operation by a driver of a vehicle; a lateral acceleration determining/detecting unit that determines/detects a lateral acceleration of the vehicle; a vehicle speed variation determining/detecting unit that determines/detects a variation of a vehicle speed (acceleration, or deceleration), in which each detected value can be stored as a latest/current value of the history data, which may include preset initial values, a series of previous values, and the latest/current value which will be returned to one of the preset initial values when shift control mode is switched; at least one of a lateral acceleration history acquiring unit that acquires a history of the lateral accelerations determined by the lateral acceleration determining unit and a vehicle speed variation history acquiring unit that acquires a history of the variations of the vehicle speed determined by the vehicle speed variation determining unit; and a downshift determining unit that determines whether downshift of the gear shift stage is to be performed based on at least one of the history of the lateral accelerations acquired by the lateral acceleration history acquiring unit and the history of the variations of the vehicle speed acquired by the vehicle speed variation history acquiring unit. The lateral acceleration history acquiring unit or the vehicle speed variation history acquiring unit returns at least one of the history of the lateral accelerations and the history of the variations of the vehicle speed to an initial value when the shift control mode determined by the shift control mode determining unit is switched. At least one of the initial value of the history of the lateral accelerations and the initial value of the history of the variations of the vehicle speed is a value that is set for each shift control mode determined by the shift control mode determining unit, i.e., the initial value for each or both of the histories is set such that it includes a set of different values varying depending upon the selected shift control mode, and the value is returned to the corresponding initial value set for the newly-selected mode. The shift control mode may be a driving mode or a shift position of the vehicle, which is selected with an operation by the driver of the vehicle.

In the control apparatus for a vehicle automatic transmission, the lateral acceleration history acquiring unit or the vehicle speed variation history acquiring unit may set a minimum value of at least one of the history of the lateral accelerations and the history of the variations of the vehicle speed when the shift control mode determined by the shift control mode determining unit is switched. At least one of the minimum value of the history of the lateral accelerations and the minimum value of the history of the variations of the vehicle speed may be a value that is set for each shift control mode determined by the shift control mode determining unit.

In the control apparatus for a vehicle automatic transmission, the control apparatus may further include a shift-hold determining unit that determines whether the current gear shift stage is to be held based on at least one of the history of the lateral accelerations acquired by the lateral acceleration history acquiring unit and the history of the variations of the vehicle speed acquired by the vehicle speed variation history acquiring unit.

With the above configuration, since at least one of the initial value of the history of the lateral accelerations and the initial value of the history of the variations of the vehicle speed is a value set for each shift position or each shift control mode determined by the shift control mode determining unit, the initial value of the history of the lateral accelerations or the initial value of the history of the variations of the vehicle speed is capable of being set to a value optimal for the shift position or the shift control mode. The determination of whether the downshift of the gear shift stage is to be performed, which is performed by the downshift determining unit, and the determination of whether the current gear shift stage is to be held, which is performed by the shift-hold determining unit, are performed based on the initial value of the history of the lateral accelerations or the initial value of the history of the variations of the vehicle speed, which is set in the above manner. Accordingly, it is possible to effectively reduce the time to match the shift characteristics in the shift position or the shift control mode after the shift position or the shift control mode is changed with the characteristics meeting the preference of the driver of the vehicle.

In the control apparatus for a vehicle automatic transmission, at least one of the initial value of the history of the lateral accelerations and the initial value of the history of the variations of the vehicle speed may be an estimated value that is set based on the previous history of the lateral accelerations or the previous history of the variations of the vehicle speed and switching of the shift control mode determined by the shift control mode determining unit.

With the above configuration, since at least one of the initial value of the history of the lateral accelerations and the initial value of the history of the variations of the vehicle speed is set based on a so-called estimated history (the history of the lateral accelerations or the history of the variations of the vehicle speed, which may be varied) by the driver of the vehicle in the current shift position or the current shift control mode, the shift characteristics in the shift position or the shift control mode after the change are capable of being further matched with the characteristics meeting the preference of the driver of the vehicle.

In the control apparatus for a vehicle automatic transmission, the control apparatus may further include a driving source of the vehicle and a rotation speed determining unit that determines a rotation speed of the driving source. The downshift determining unit may determine whether the downshift of the gear shift stage is to be performed based on the rotation speed of the driving source, which is determined by the rotation speed determining unit. The history of the lateral accelerations acquired by the lateral acceleration history acquiring unit or the history of the variations of the vehicle speed acquired by the vehicle speed variation history acquiring unit may be associated with the rotation speed of the driving source on which the determination of whether the downshift of the gear shift stage is to be performed is based. Alternatively, the shift-hold determining unit may determine whether the current gear shift stage is to be held based on the rotation speed of the driving source, which is determined by the rotation speed determining unit. The history of the lateral accelerations acquired by the lateral acceleration history acquiring unit or the history of the variations of the vehicle speed acquired by the vehicle speed variation history acquiring unit may be associated with the rotation speed of the driving source on which the determination of whether the current gear shift stage is to he held is based.

In the control apparatus for a vehicle automatic transmission, the shift control mode may include a normal driving mode in which shift control based on a normal shift map is performed and a sport driving mode in which shift control based on a sport driving shift map is performed.

With the above configuration, for example, when the driver temporarily changes the driving mode from the sport driving mode to the normal driving mode and, then, changes the driving mode to the sport driving mode in the selection (switching) of the shift control mode by the driver, the shift characteristics in the sport driving mode after the change are capable of being matched with the characteristics meeting the preference of the driver of the vehicle in a short time.

In the control apparatus for a vehicle automatic transmission, the shift control mode may include multiple shift positions selected with operations by the driver.

According to the control apparatus for a vehicle automatic transmission of the present disclosure, it is possible to match the shift characteristics in the shift position or the shift control mode after change with the characteristics meeting the preference of the driver in a short time by estimating and varying the acceleration and deceleration history and the lateral acceleration history of the vehicle. The word "unit" used in this application may mean a physical part or component of computer hardware or any device including a controller, a processor, a memory, etc., which is particularly configured to perform functions and steps disclosed in the application.

DESCRIPTION OF THE PREFERRED EMBODIMENTS

Figure 1:
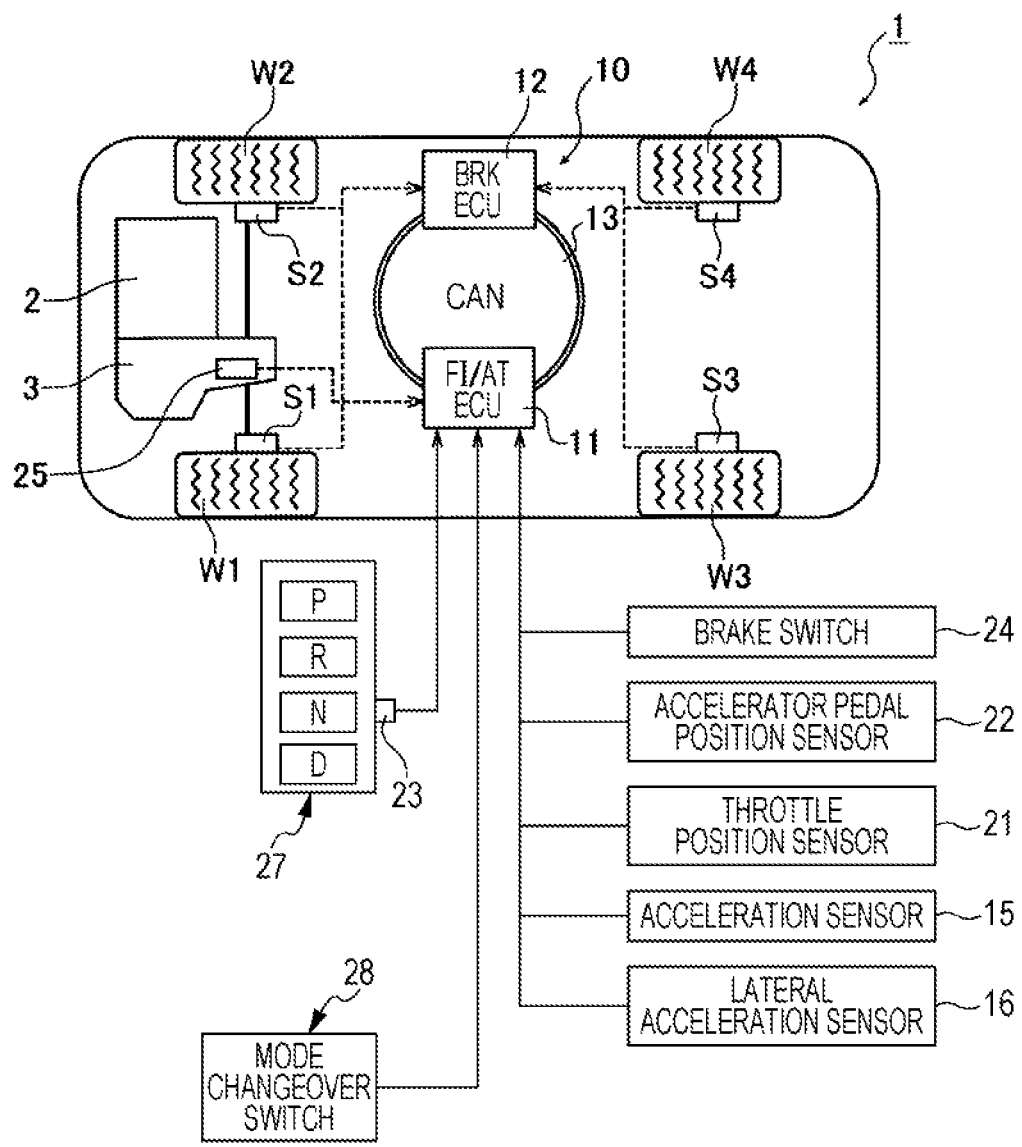
FIG. 1 schematically illustrates an exemplary configuration of a vehicle provided with a control apparatus for a vehicle automatic transmission according to an embodiment of the present disclosure.

Embodiments of the present disclosure will herein be described in detail with reference to the drawings. FIG. 1 schematically illustrates an exemplary configuration of a vehicle provided with a control apparatus for a vehicle automatic transmission according to an embodiment of the present disclosure. Referring to FIG. 1, a vehicle 1 includes an engine 2 and an automatic transmission 3 including a multi-stage speed change gear mechanism. An output from the engine 2 is transmitted to driving wheels (front wheels) W1 and W2 through the automatic transmission 3. The vehicle 1 also includes a control unit (electronic control unit (ECU)) 10 that uses a microcomputer for driving and controlling the vehicle 1. The control unit 10 includes a fuel injection-automatic transmission (FI-AT) ECU 11 for controlling the engine 2 and the automatic transmission 3 and a brake ECU (or a vehicle stability assist (VSA) ECU) 12 for controlling the behavior of the vehicle including control of a brake. The FI-AT ECU 11 is connected to the brake ECU 12 over a controller area network (CAN) 13.

Signals from a throttle position sensor 21, an accelerator pedal position sensor 22, a shift position sensor 23, and a brake switch 24 are input into the control unit 10. The throttle position sensor 21 detects the position of a throttle valve. The accelerator pedal position sensor 22 detects the position of an accelerator pedal. The shift position sensor 23 detects the current shift position (gear shift stage) 27 of the automatic transmission 3. The brake switch 24 detects the actuation of the brake. In contrast, a shift control signal is supplied from the control unit 10 to the automatic transmission 3. In addition, data concerning acceleration (variation of the vehicle speed or forward and backward acceleration) of the vehicle, which is detected by an acceleration sensor 15, and data concerning lateral acceleration of the vehicle, which is detected by a lateral acceleration sensor 16, are input into the control unit 10. The acceleration (the forward and backward acceleration) and the lateral acceleration of the vehicle may be calculated from a value detected by another sensor, instead of using the input values from the acceleration sensor and the lateral acceleration sensor.

In addition, wheel speed sensors S1 to S4 that detect the wheel speeds of the left and right front wheels W1 and W2 and left and right rear wheels W3 and W4 are mounted in the vehicle 1. Furthermore, a rotation sensor 25 that detects the rotation speed (rotation pulse) of a counter axis (not illustrated) of the automatic transmission 3 is mounted in the vehicle 1. Values (wheel speed pulses) detected by the wheel speed sensors S1 to S4 are input into the brake ECU 12. A value detected by the rotation sensor 25 is input into the FI-AT ECU 11.

Reference numeral 27 indicates shift positions of a shift lever (select lever). A shift position P indicates a parking range, a shift position R indicates a reverse range, a shift position N indicates a neutral range, and a shift position D indicates a drive range. When the shift lever is in the D range, the vehicle 1 is in an automatic shift mode in which the gear shift stage or the transmission gear ratio to foe determined is determined based on the driving state to perform a gear shift operation. A normal mode (normal driving mode), which is a shift mode mainly for a driver having a general driving skill, and a sport driving mode, which is a shift mode valuing the driving (driving feel, acceleration feel, and so on) of the vehicle in order to meet the preference of a driver having a high driving skill, are provided as driving modes of the vehicle (shift control modes of the automatic transmission 3) in the control apparatus of the present embodiment. A mode changeover switch 28 used to switch the driving mode of the vehicle between the normal driving mode and the sport driving mode is provided in the vehicle 1. The shift control based on a normal shift map is performed in the normal driving mode and the shift control based on a sport driving shift map is performed in the sport driving mode, although how the shift controls are performed is not illustrated and a detailed description of the shift controls is omitted. For example, an economic mode, which is a driving mode contributing to a reduction in fuel efficiency (fuel consumption rate) of the vehicle, may be included in the driving modes of the vehicle.

In the present embodiment, switching between the automatic shift mode and a manual shift mode is performed for setting and the set shift mode is used as the shift mode in the automatic transmission 3. In the automatic shift mode, the gear shift stage to be set is determined based on the driving state of the vehicle to automatically perform the gear shift operation. In the manual shift mode, the gear shift operation instructed by a manual operation by the driver is performed. The control in the manual shift mode is performed using a paddle switch provided near a steering gear (not illustrated). Alternatively, a positive position and a negative position for the manual shift control may be provided on the shift lever, instead of the paddle switch.

In the control apparatus for a vehicle automatic transmission of the present embodiment, it is determined whether downshift (automatic downshift) of the gear shift stage is to be performed during the sport driving mode and the downshift is performed based on the result of the determination. A process of performing the downshift determination, which is performed during the sport driving mode, will now be described with reference to a flowchart in FIG. 2.

Figure 2:
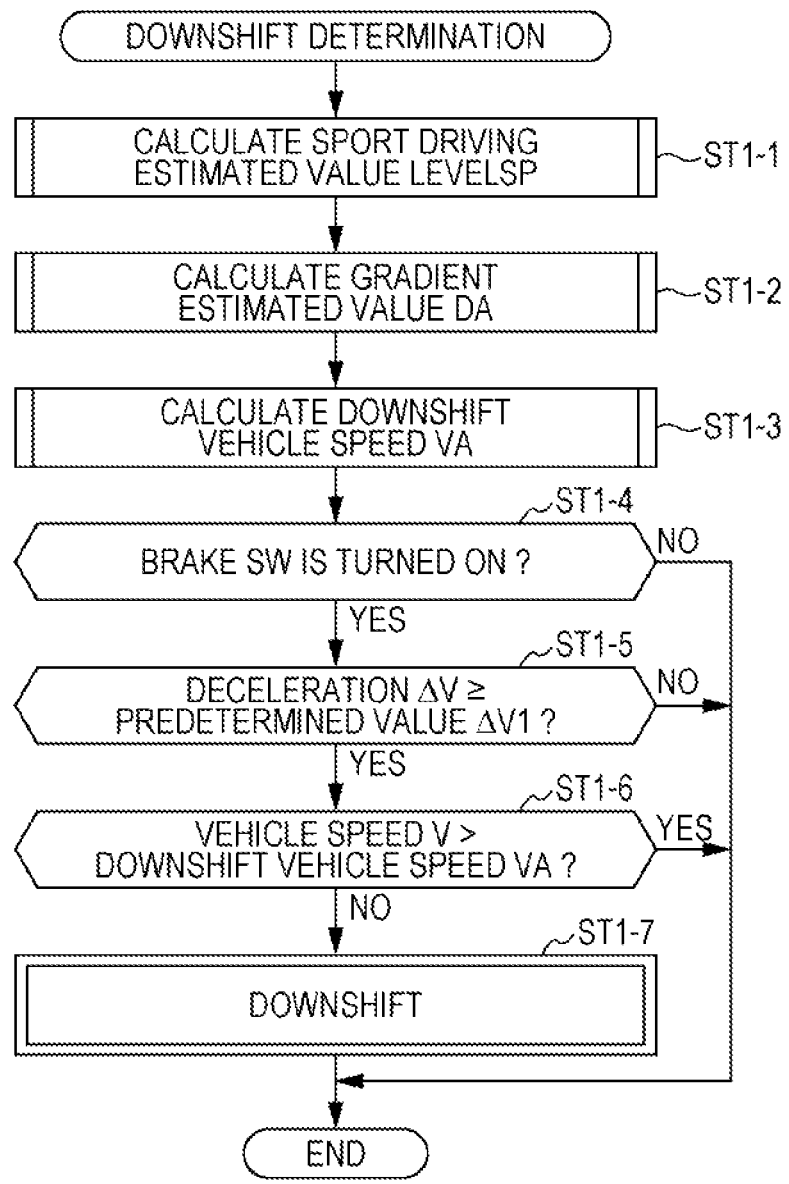
FIG. 2 is a flowchart illustrating a process of performing downshift determination.
Figure 3A:
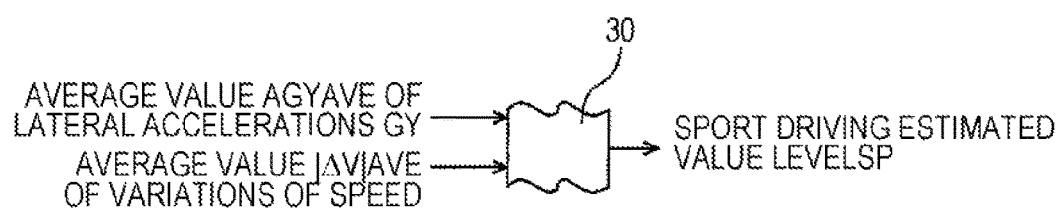
FIG. 3A is a conceptual diagram illustrating how a sport driving estimated value is calculated.

Referring to FIG. 2, in the downshift determination, in Step ST1-1, a sport driving estimated value (driving state estimated value) LEVELSP is calculated. FIG. 3A is a conceptual diagram illustrating how the sport driving estimated value LEVELSP is calculated. As illustrated in FIG. 3A, the sport driving estimated value LEVELSP is a value (dimensionless value) calculated through search for a value on a two-dimensional map 30. In the two-dimensional map 30, the horizontal axis or the vertical axis represents the average value (|ΔV|AVE) of variations of a vehicle speed V and the vertical axis or the horizontal axis represents the average value (AGYAVE) of lateral accelerations GY. Specifically, the sport driving estimated value LEVELSP is increased as the average value of the lateral accelerations of the vehicle (a history of the lateral accelerations) is increased, and the sport driving estimated value LEVELSP is increased as the average value (|ΔV|AVE) of the variations of the vehicle speed V (a history of the variations of the vehicle speed) is increased.

Referring back to FIG. 2, in Step ST1-2, a gradient estimated value DA of the road on which the vehicle 1 is driving is calculated. In the calculation of the gradient estimated value DA, first, an estimated acceleration which the vehicle 1 is estimated to output is calculated based on the vehicle speed V and an engine load (throttle position). Next, an actual acceleration or deceleration is calculated from the degree of increase or decrease of the vehicle speed V per unit time and the estimated acceleration that is calculated is compared with the actual acceleration. It is determined that the vehicle 1 is driving on a flat road if the actual acceleration is substantially equal to the estimated acceleration, that the vehicle 1 is driving on a downhill road if the actual acceleration exceeds the estimated acceleration, and that the vehicle 1 is driving on an uphill road if the actual acceleration is lower than the estimated acceleration. The gradient estimated value DA is calculated through the determination of whether the vehicle 1 is driving on an uphill road or a downhill road based on the comparison between the actual acceleration and the estimated acceleration.

Figure 3B:
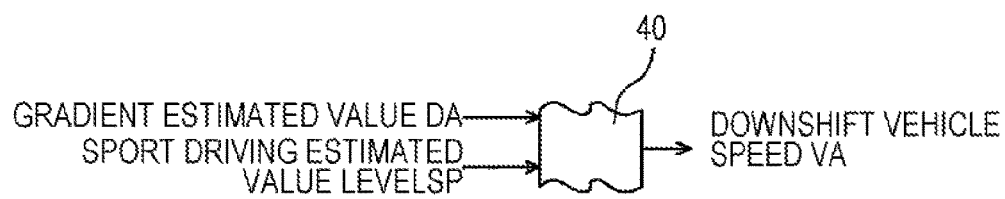
FIG. 3B is a conceptual diagram illustrating how a downshift vehicle speed is calculated.

In Step ST1-3, a downshift vehicle speed VA is calculated. FIG. 3B is a conceptual diagram illustrating how the downshift vehicle speed is calculated. As illustrated in FIG. 3B, the downshift vehicle speed VA is calculated through search for a value on a downshift vehicle speed map (shift map) 40 based on the gradient estimated value DA and the sport driving estimated value LEVELSP.

Referring back to FIG. 2, in Step ST1-4, it is determined whether the brake switch is turned on. If the brake pedal is not operated by the driver, the brake switch is turned off. In this case (NO in Step ST1-4), it is determined that the driver has no intention of deceleration and the process illustrated in FIG. 2 is terminated without performing the downshift. If the brake pedal is operated by the driver and the brake switch is turned on, it is determined that the driver has an intention of deceleration. In this case (YES in Step ST-4), the process proceeds to Step ST1-5. In Step ST1-5, it is determined whether a deceleration $\Delta V$ of the vehicle 1 is higher than or equal to a predetermined value $\Delta V1$ ($\Delta V \geq \Delta V1$). If the deceleration $\Delta V$ is lower than the predetermined value $\Delta V1$ (NO in Step ST1-5), the process illustrated in FIG. 2 is terminated without performing the downshift. If the deceleration $\Delta V$ is higher than or equal to the predetermined value $\Delta V1$ (YES in Step ST1-5), the process proceeds to Step ST1-6. In Step ST1-6, it is determined whether the current vehicle speed V is higher than the downshift vehicle speed VA (V>VA). If the current vehicle speed V is higher than the downshift vehicle speed VA (YES in Step ST1-6), the process illustrated in FIG. 2 is terminated without performing the downshift. If the current vehicle speed V is lower than or equal to the downshift vehicle speed VA (NO 10 in Step ST1-6), the process proceeds to Step ST1-7. In Step ST1-7, the downshift is performed.

Figure 4:
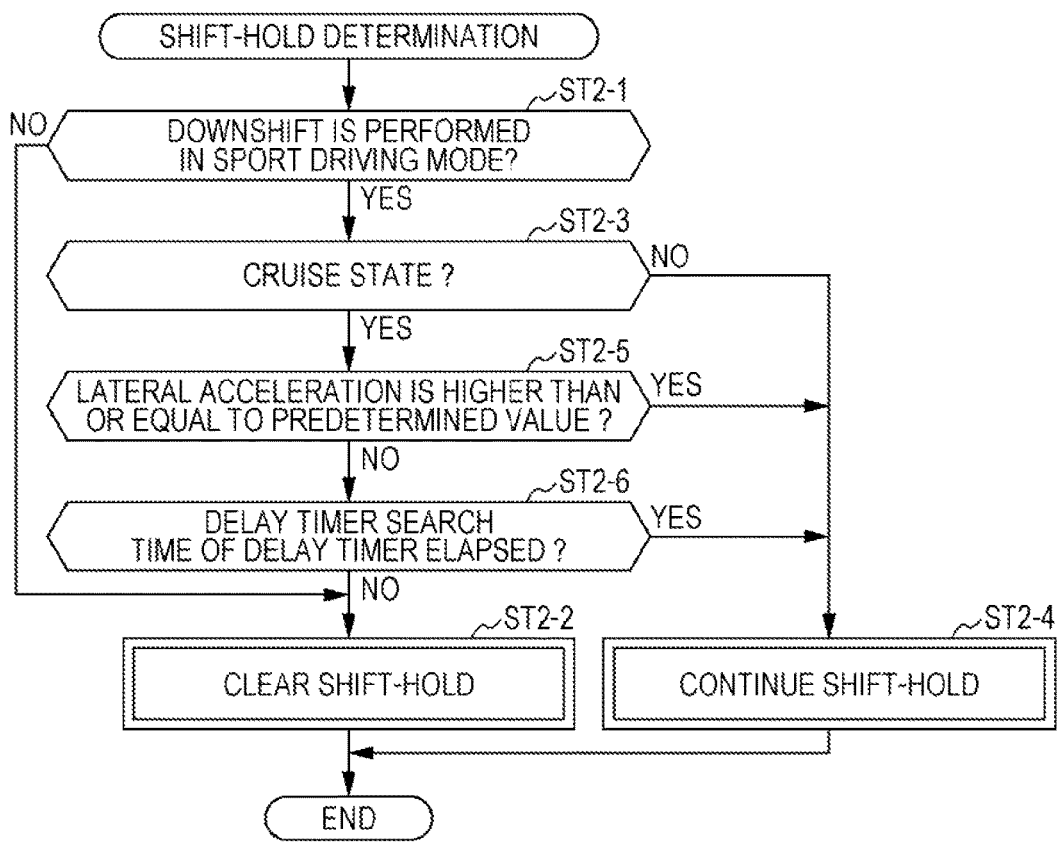
FIG. 4 is a flowchart illustrating a process of performing shift-hold determination.

A process of performing shift-hold determination after the downshift will now be described with reference to a flowchart in FIG. 4. Referring to FIG. 4, in the shift-hold determination, in Step ST2-1, it is determined whether the downshift (Step ST1-7) is performed in the sport driving mode. If the downshift is not performed (NO in Step ST2-1), the process proceeds to Step ST2-2. In Step ST2-2, the shift-hold is cleared. Then, the process illustrated in FIG. 4 is terminated. If the downshift is performed (YES in Step ST2-1), the process proceeds to Step ST2-3. In Step ST2-3, it is determined whether the vehicle 1 is in a cruise state. The determination (cruise determination) of whether the vehicle 1 is in the cruise state is performed based on the average value of the amounts of operation of the accelerator pedal and the average value of the accelerations of the vehicle 1. If the vehicle 1 is not in the cruise state (NO in Step ST2-3), the process proceeds to Step ST2-4. In Step ST2-4, the shift-hold in the gear shift stage after the downshift is continued. Then, the process illustrated in FIG. 4 is terminated. If the vehicle 1 is in the cruise state (YES in Step ST2-3), the process proceeds to Step ST2-5. In Step ST2-5, it is determined whether the lateral acceleration (the history of the lateral accelerations) of the vehicle 1 is higher than or equal to a predetermined value.

If the lateral acceleration is higher than or equal to the predetermined value (YES in Step ST2-5), the process proceeds to Step ST2-4. In Step ST2-4, the shift-hold in the gear shift stage after the downshift is continued. Then, the process illustrated in FIG. 4 is terminated. If the lateral acceleration is lower than the predetermined value (NO in Step ST2-5), the process proceeds to Step ST2-6. In Step ST2-6, delay timer search is performed and it is determined whether the time of the delay timer elapsed. If the time of the delay timer elapsed (YES in Step ST2-6), the process proceeds to Step ST2-4. In Step ST2-4, the shift-hold is continued. Then, the process illustrated in FIG. 4 is terminated. If the time of the delay timer did no elapse (NO in Step ST2-6), the process proceeds to Step ST2-2. In Step ST2-2, the shift-hold is cleared. Then, the process illustrated in FIG. 4 is terminated.

As described above, in the control apparatus for a vehicle automatic transmission of the present embodiment, the determination of whether the downshift of the gear shift stage is to be performed and the determination of whether the current gear shift stage is to be held are performed based on at least one of the history of the lateral accelerations and the history of the variations of the vehicle speed of the vehicle. As described below, when the shift position or the driving mode, which is selected by the driver of the vehicle, is switched, at least one of the history of the lateral accelerations and the history of the variations of the vehicle speed is returned to an initial value. The initial value of the history of the lateral accelerations or the initial value of the history of the variations of the vehicle speed is set for each shift position or driving mode that is selected. This will be described in detail below.

Figure 5:
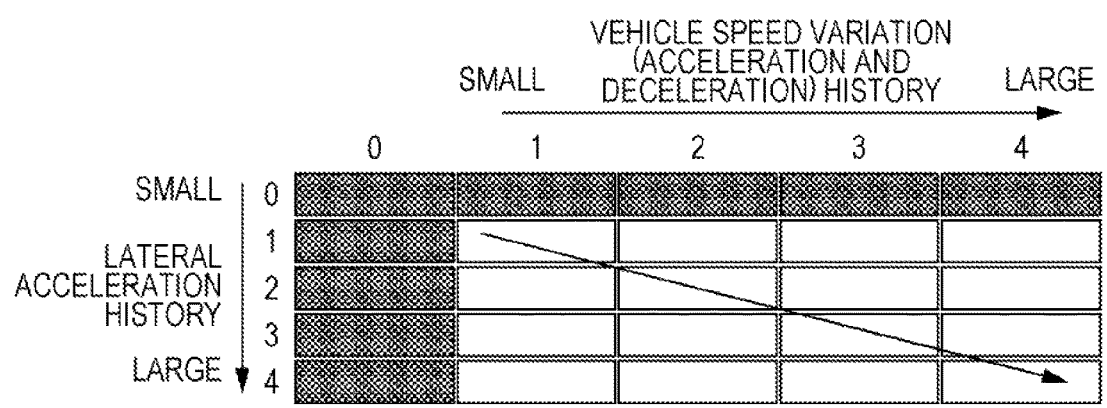
FIG. 5 is a table illustrating an example of the distribution of parameters for permission of downshift, which is based on a history of variations of a vehicle speed (acceleration or deceleration) and a history of lateral accelerations of the vehicle.

FIG. 5 is a table illustrating an example of the distribution of parameters for permission of the downshift, which is based on the history of the variations of the vehicle speed and the history of the lateral accelerations of the vehicle. In the table in FIG. 5, the horizontal axis represents the history of the variations of the vehicle speed (the forward and backward acceleration or acceleration and deceleration) of the vehicle and the vertical axis represents the history of the lateral accelerations of the vehicle. Each of the history of the variations of the vehicle speed and the history of the lateral accelerations is divided into multiple stages (five stages of 0 and 1 to 4 in FIG. 5) and the stages are represented as a matrix. When representation of a figure-figure, such as 1-1, is made in the following description, the representation indicates the numerical values (the position, of a column in the matrix) of the history of the variations of the vehicle speed-the history of the lateral accelerations in the table in FIG. 5.

In the shift control of the present embodiment, at least one of the history of the lateral accelerations and the history of the variations of the vehicle speed is returned to an initial value when the shift position or the driving mode selected by the driver of the vehicle is switched, as described above, and the initial value is set for each shift position or driving mode. Accordingly, for example, the initial value of the history of the variations of the vehicle speed and the initial value of the history of the lateral accelerations when the normal driving mode is selected as the driving mode are set to the values in a column 1-1 in the table in FIG. 5 while the initial value of the history of the variations of the vehicle speed and the initial value of the history of the lateral accelerations when the sport driving mode is selected as the driving mode are set to the values in a column 2-2 in the table in FIG. 5. In this case, the driving having a greater variation of the vehicle speed or a higher lateral acceleration of the vehicle is supposed in the sport driving mode, compared with that in the normal driving mode, due to the driving by the driver. However, setting the initial value of the history of the variations of the vehicle speed and the initial value of the history of the lateral accelerations to values higher than those in the normal driving mode, as described above, enables the time to set the histories to final values to be shortened. Accordingly, it is possible to reduce the time to match shift characteristics in the shift position or the driving mode after the driving mode is changed in response to an operation by the driver with characteristics meeting the preference of the driver.

Minimum values may be set in advance for the history of the lateral accelerations and the history of the variations of the vehicle speed. Also in this case, the minimum values are set for each shift position or driving mode used in the driving by the driver. Accordingly, the minimum value of the history of the variations of the vehicle speed and the minimum value of the history of the lateral accelerations, for example, when the normal driving mode is selected as the driving mode may be set to the values in the column 1-1 in the table in FIG. 5 while the minimum value of the history of the variations of the vehicle speed and the minimum value of the history of the lateral accelerations when the sport driving mode is selected as the driving mode may foe set to the values in the column 2-2 in the table in FIG. 5. In this case, the driving having a greater variation of the vehicle speed or a higher lateral acceleration of the vehicle is supposed in the sport driving mode, compared with that in the normal driving mode, due to the driving by the driver. Accordingly, setting the minimum value of the history of the variations of the vehicle speed and the minimum value of the history of the lateral accelerations to values higher than those in the normal driving mode, as described above, enables final values to which the histories are set to be optimal values and enables the time to set the histories to the final values to be shortened. Accordingly, it is possible to reduce the time to match the shift characteristics in the driving mode after the driving mode is changed in response to an operation by the driver with the characteristics meeting the preference of the driver. In other words, determining the tendency of the shift characteristics based OR estimation of the intention of the driver in advance enables the shift characteristics meeting the preference of the driver to be achieved in a shorter time.

It is not necessary to establish correlation between the history of the variations of the vehicle speed and the history of the lateral accelerations. Accordingly, the initial value or the minimum value of only one of the history of the variations of the vehicle speed and the history of the lateral accelerations may be varied depending on the driving mode or the shift position that is selected.

In the example in FIG. 5, the permission of the downshift (whether the downshift is to be performed) is determined based on the history of the variations of the vehicle speed and the history of the lateral accelerations of the vehicle. Specifically, for example, the value of an allowable rotation speed of the engine 2, at which the downshift is permitted, is set in advance and the relationship between the value of the allowable rotation speed and the values (the position in the table in FIG. 5) of the history of the variations of the vehicle speed and the history of the lateral accelerations of the vehicle is set in advance. The downshift is permitted at a time when the history of the variations of the vehicle speed and the history of the lateral accelerations of the vehicle reach the position set in advance.

Although the determination of the permission of the downshift (whether the downshift is to be performed) is made based on the history of the variations of the vehicle speed and the history of the lateral accelerations of the vehicle in the above embodiment, for example, the rotation speed (allowable rotation speed) of the engine 2 at which the shift-hold is permitted and the duration time of the shift-hold may be determined based on the history of the variations of the vehicle speed and the history of the lateral accelerations of the vehicle.

As described above, the control apparatus for a vehicle automatic transmission of the present embodiment Includes a shift control mode determining unit (the control unit 10) that determines a shift control mode selected with an operation by a driver of a vehicle; a lateral acceleration determining unit (the lateral acceleration sensor 16 or the control unit 10) that determines a lateral acceleration of the vehicle; a vehicle speed variation determining unit (the acceleration sensor 15 or the control unit 10) that determines a variation of a vehicle speed; at least one of a lateral acceleration history acquiring unit (the control unit 10) that acquires a history of the lateral accelerations determined by the lateral acceleration determining unit and a vehicle speed variation history acquiring unit (the control unit 10) that acquires a history of the variations of the vehicle speed determined by the vehicle speed variation determining unit; and a downshift determining unit (the control unit 10) that, determines whether downshift of the gear shift stage is to be performed based on at least one of the history of the lateral accelerations acquired by the lateral acceleration history acquiring unit and the history of the variations of the vehicle speed acquired by the vehicle speed variation history acquiring unit. The lateral acceleration history acquiring unit or the vehicle speed variation history acquiring unit returns at least one of the history of the lateral accelerations or the history of the variations of the vehicle speed to an initial value when the shift control mode determined by the shift control mode determining unit is switched. At least one of the initial value of the history of the lateral accelerations and the initial value of the history of the variations of the vehicle speed is a value that is set for each shift control mode determined by the shift control mode determining unit. The shift control mode is a driving mode (the normal driving mode or the sport driving mode) of the vehicle or the shift position (P, R, N, or D) of the vehicle, which is selected with an operation by the driver of the vehicle.

The control apparatus for a vehicle automatic transmission further includes a shift-hold determining unit (the control unit 10) that determines whether the current gear shift stage is to be held based on at least one of the history of the lateral accelerations acquired by the lateral acceleration history acquiring unit and the history of the variations of the vehicle speed acquired by the vehicle speed variation history acquiring unit.

According to the control apparatus for a vehicle automatic transmission of the present embodiment, since at least one of the initial value of the history of the lateral accelerations and the initial value of the history of the variations of the vehicle speed of the vehicle is a value set for each shift position or each shift control mode determined by the shift control mode determining unit, the initial value of the history of the lateral accelerations or the initial value of the history of the variations of the vehicle speed is capable of being set to a value optimal for the shift position or the shift control mode. The determination of whether the downshift of the gear shift stage is to be performed, which is performed by the downshift determining unit, and the determination of whether the current gear shift stage is to be held, which is performed by the shift-hold determining unit, are performed based on the initial value of the history of the lateral accelerations or the initial value of the history of the variations of the vehicle speed, which is set in the above manner. Accordingly, it is possible to reduce the time to match the shift characteristics in the shift position or the shift control mode after the shift position or the shift control mode is changed with the characteristics meeting the preference of the driver of the vehicle.

In the present embodiment, the initial value of the history of the lateral accelerations and the initial value of the history of the variations of the vehicle speed are estimated values that are set based on the previous history of the lateral accelerations or the previous history of the variations of the vehicle speed and switching of the shift control mode determined by the shift control mode determining unit.

With the above configuration, since at least one of the initial value of the history of the lateral accelerations and the initial value of the history of the variations of the vehicle speed is set based on a so-called estimated history (the history of the lateral accelerations or the history of the variations of the vehicle speed, which may be varied) by the driver of the vehicle in the current shift position or the current shift control mode, the shift characteristics in the shift position or the shift control mode after the change are capable of being further matched with the characteristics meeting the preference of the driver of the vehicle.

In the present embodiment, the determination of whether the downshift of the gear shift stage is to be performed may be made based the rotation speed of the engine 2, and the history of the lateral accelerations or the history of the variations of the vehicle speed may be associated with the rotation speed of the engine 2, on which the determination of whether the downshift of the gear shift stage is to be performed is based. Alternatively, the shift-hold determining unit may determine whether the current gear shift stage is to be held based on the rotation speed of the engine 2, and the history of the lateral accelerations or the history of the variations of the vehicle speed may be associated with the rotation speed of the engine 2, on which the determination of whether the current gear shift stage is to be held is based.

In the present embodiment, the shift control modes includes the normal driving mode in which the shift control based on the normal shift map is performed and the sport driving mode in which the shift control based on the sport driving shift map is performed.

With the above configuration, for example, when the driver temporarily changes the driving mode from the sport driving mode to the normal driving mode and, then, changes the driving mode to the sport driving mode in the selection (switching) of the shift control mode by the driver, the shift characteristics in the sport driving mode after the change are capable of being matched with the characteristics meeting the preference of the driver of the vehicle in a short time.

While the present disclosure is described in terms of some specific examples and embodiments, it will be clear that the present disclosure is not limited to these specific examples and embodiments and that many changes and modifications can be made without departing from the true spirit and scope of the present disclosure.

What is claimed is:

1. A control apparatus for controlling a vehicle automatic transmission to perform upshift and downshift control of a gear shift stage, the control apparatus being capable of performing at least the downshift control in preset different shift control modes switchable by a driver of a vehicle and comprising:
    a shift control mode determining unit configured to detect one of the preset different shift control modes which is selected by the driver;
    a lateral acceleration determining unit configured to detect a lateral acceleration of the vehicle;
    a vehicle speed variation determining unit configured to detect a variation of a vehicle speed;
    at least one of a lateral acceleration history acquiring unit configured to acquire a history of the lateral accelerations detected by the lateral acceleration determining unit and a vehicle speed variation history acquiring unit configured to acquire a history of the variations of the vehicle speed detected by the vehicle speed variation determining unit; and
    a downshift determining unit configured to determine whether downshift of the gear shift stage is to be performed based on at least one of the history of the lateral accelerations acquired by the lateral acceleration history acquiring unit and the history of the variations of the vehicle speed acquired by the vehicle speed variation history acquiring unit,
    wherein the lateral acceleration history acquiring unit or the vehicle speed variation history acquiring unit returns at least one of the history of the lateral accelerations and the history of the variations of the vehicle speed to a corresponding initial value when it is detected that the shift control mode is switched by the driver between the preset different shift control modes, and
    wherein at least one of the initial value of the history of the lateral accelerations and the initial value of the history of the variations of the vehicle speed is a value that varies depending upon the selected shift control mode such that at least one of the history of the lateral accelerations and the history of the variations of the vehicle speed is returned to one of the varied initial values which corresponds to the selected shift control mode when it is switched.

2. The control apparatus for the vehicle automatic transmission according to claim 1,
    wherein the lateral acceleration history acquiring unit or the vehicle speed variation history acquiring unit sets as the initial value a minimum value of at least one of the history of the lateral accelerations and the history of the variations of the vehicle speed when the shift control mode is switched by the driver, and
    wherein at least one of the minimum value of the history of the lateral accelerations and the minimum value of the history of the variations of the vehicle speed is a value that varies depending upon the selected shift control mode.

3. The control apparatus for the vehicle automatic transmission according to claim 1, the control apparatus further comprising:
    a shift-hold determining unit configured to determine whether the current gear shift stage is to be held based on at least one of the history of the lateral accelerations acquired by the lateral acceleration history acquiring unit and the history of the variations of the vehicle speed acquired by the vehicle speed variation history acquiring unit.

4. The control apparatus for the vehicle automatic transmission according to claim 1,
wherein at least one of the initial value of the history of the lateral accelerations and the initial value of the history of the variations of the vehicle speed is an estimated value that is set based on the previous history of the lateral accelerations or the previous history of the variations of the vehicle speed and switching of the shift control mode determined by the shift control mode determining unit.

5. The control apparatus for the vehicle automatic transmission according to claim 1, the control apparatus further comprising:
a driving source of the vehicle; and
a rotation speed determining unit configured to detect a rotation speed of the driving source,
wherein the downshift determining unit determines whether the downshift of the gear shift stage is to be performed based on the rotation speed of the driving source, which is detected by the rotation speed determining unit, and
wherein the history of the lateral accelerations acquired by the lateral acceleration history acquiring unit or the history of the variations of the vehicle speed acquired by the vehicle speed variation history acquiring unit is associated with the rotation speed of the driving source on which the determination of whether the downshift of the gear shift stage is to be performed is based.

6. The control apparatus for the vehicle automatic transmission according to claim 3, the control apparatus further comprising:
a driving source of the vehicle; and
a rotation speed determining unit configured to detect a rotation speed of the driving source,
wherein the shift-hold determining unit determines whether a current gear shift stage is to be held based on the rotation speed of the driving source, which is detected by the rotation speed determining unit, and
wherein the history of the lateral accelerations acquired by the lateral acceleration history acquiring unit or the history of the variations of the vehicle speed acquired by the vehicle speed variation history acquiring unit is associated with the rotation speed of the driving source on which the determination of whether the current gear shift stage is to be held is based.

7. The control apparatus for the vehicle automatic transmission according to claim 1,
wherein the preset different shift control modes comprise a normal driving mode in which the shift control is performed based on a normal shift map and a sport driving mode in which shift control is performed based on a sport driving shift map.

8. The control apparatus for a vehicle automatic transmission according to claim 1,
wherein the preset different shift control modes comprise a plurality of shift positions selected by the driver.

* * * * *